US010210148B2

(12) United States Patent
Wu et al.

(10) Patent No.: US 10,210,148 B2
(45) Date of Patent: Feb. 19, 2019

(54) METHOD AND APPARATUS FOR FILE PROCESSING

(75) Inventors: Yaqiang Wu, Beijing (CN); Jianzhong Zhang, Beijing (CN); Zhepeng Wang, Beijing (CN); Chao Xu, Beijing (CN); Wei Wang, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 661 days.

(21) Appl. No.: 13/813,720

(22) PCT Filed: Aug. 1, 2011

(86) PCT No.: PCT/CN2011/077865
§ 371 (c)(1),
(2), (4) Date: Feb. 1, 2013

(87) PCT Pub. No.: WO2012/016505
PCT Pub. Date: Feb. 9, 2012

(65) Prior Publication Data
US 2013/0132816 A1    May 23, 2013

(30) Foreign Application Priority Data
Aug. 2, 2010 (CN) .......................... 2010 1 0243566

(51) Int. Cl.
*G06F 17/22* (2006.01)
*G06F 17/24* (2006.01)
(52) U.S. Cl.
CPC ........ *G06F 17/241* (2013.01); *G06F 17/2217* (2013.01)

(58) Field of Classification Search
None
See application file for complete search history.

(56) References Cited

U.S. PATENT DOCUMENTS 5,684,891 A * 11/1997 Tanaka ..................... G06K 9/34
382/176
5,915,032 A * 6/1999 Look ................. G06K 7/10584
382/100

(Continued)

FOREIGN PATENT DOCUMENTS

CN        1393107 A     1/2003
CN      101051323 A    10/2007

(Continued)

OTHER PUBLICATIONS

International Search Report of the State Intellectual Property Office of the P.R. China in application No. PCT/CN2011/077865, dated Oct. 27, 2011.

*Primary Examiner* — Scott T Baderman
*Assistant Examiner* — Steven Golden
(74) *Attorney, Agent, or Firm* — Kinney & Lange, P.A.

(57) ABSTRACT

The embodiments of the present invention provide a method and an apparatus for file processing. The method for file processing includes: obtaining a file; parsing the file to obtain a first character contained in the file; matching the first character with a preconfigured matching character library; obtaining an annotation corresponding to the first character when the first character satisfies a predetermined condition; and displaying the first character and the annotation. With the embodiments of the present invention, automatic annotation can be provided for a particular character in a file, such that the user's reading experience can be improved.

13 Claims, 10 Drawing Sheets

(56) References Cited

U.S. PATENT DOCUMENTS

| | | | | |
|---|---|---|---|---|
| 6,128,632 | A * | 10/2000 | McCully | G06F 17/2863 715/210 |
| 6,262,728 | B1 * | 7/2001 | Alexander | G01R 13/0245 345/440.1 |
| 6,551,357 | B1 * | 4/2003 | Madduri | G06F 17/241 345/592 |
| 6,639,609 | B1 * | 10/2003 | Hayashi | G06F 17/3089 707/E17.116 |
| 7,418,656 | B1 * | 8/2008 | Petersen | G06F 17/241 715/230 |
| 2002/0049588 | A1 * | 4/2002 | Bennett | G06F 17/24 704/235 |
| 2002/0086269 | A1 * | 7/2002 | Shpiro | G09B 7/02 434/156 |
| 2003/0214528 | A1 | 11/2003 | Pierce et al. | |
| 2004/0267798 | A1 * | 12/2004 | Chatterjee | G06F 17/241 |
| 2007/0055926 | A1 * | 3/2007 | Christiansen | G06F 17/241 715/210 |
| 2007/0242071 | A1 * | 10/2007 | Harding | G06F 17/276 345/469.1 |

FOREIGN PATENT DOCUMENTS

| | | |
|---|---|---|
| CN | 101196874 A | 6/2008 |
| CN | 101408874 A | 4/2009 |
| CN | 101420313 A | 4/2009 |
| CN | 201259670 Y | 6/2009 |
| CN | 101645065 A | 2/2010 |
| CN | 101645190 A | 2/2010 |
| CN | 101765840 A | 6/2010 |
| WO | 2006029259 A2 | 3/2006 |

* cited by examiner

METHOD AND APPARATUS FOR FILE PROCESSING

TECHNICAL FIELD

The present invention relates to text processing, and more particularly, to a method and an apparatus for file processing.

BACKGROUND

When a user is reading a file on an electronic device (such as computer, Personal Digital Assistant (PDA), mobile phone, e-paper, etc.), he/she may encounter some characters/words which he/she does not recognize or some characters/words whose pronunciations or meanings he/she cannot determine, such as characters/words which are rarely used or have more than one pronunciation. Such characters/words will hinder the user from fully understanding the content of the file.

In order to facilitate full understanding of the content of the file, in the prior art, if the user encounters a rare character/word when reading the file, he/she needs to stop reading to look up the character/word in a dictionary, for example, so as to determine the pronunciation and meaning of the character/word. Apparently, such lookup operation requires the user to interrupt his/her continuous reading process. This loss of reading continuity will severely degrade the reading experience of the user.

SUMMARY

An object of the present invention is to provide a method and an apparatus for file processing, capable of providing an automatic annotation for a particular character in a file, such that the reading experience of the user can be improved.

In order to achieve the above object, a method for file processing is provided according to an embodiment of the present invention. The method for file processing includes: obtaining a file; parsing the file to obtain a first character contained in the file; matching the first character with a preconfigured matching character library; obtaining an annotation corresponding to the first character when the first character satisfies a predetermined condition; and displaying the first character and the annotation.

Preferably, in the above method for file processing, displaying the first character and the annotation includes: displaying the first character in accordance with a display scheme having a first display effect; and displaying the annotation in accordance with a second display scheme having a second display effect different from the first display effect.

Preferably, in the above method for file processing, displaying the first character and the annotation includes: obtaining an original composition of the file; determining a display position of the annotation with respect to the first character; judging whether there is space to accommodate the annotation at the display position in the original composition; and re-composing the file to obtain a new composition when there is no space to accommodate the annotation, such that there is space to accommodate the annotation at the display position in the new composition, displaying the first character in accordance with the new composition and displaying the annotation at the display position.

Preferably, in the above method for file processing, the predetermined condition is that the first character does not belong to the matching character library or that the first character belongs to the matching character library.

Preferably, in the above method for file processing, the annotation includes at least one of a phonetic symbol for indicating pronunciation and intonation of the first character, explanation information for explaining meaning of the first character, a play control menu for controlling an audio file playing pronunciation of the first character, and a translation of the first character in a language different from a language in which the first character is written.

Preferably, in the above method for file processing, when the annotation includes the phonetic symbol, the matching character library includes a preconfigured common character library including preconfigured common characters and a preconfigured error-prone character library including preconfigured characters prone to pronunciation errors, and the predetermined condition is that the first character does not belong to the common character library or that the first character belongs to the error-prone character library.

Preferably, in the above method for file processing, when the annotation includes the phonetic symbol, the method further includes, after parsing the file to obtain the first character contained in the file: applying word segmentation to the first character based on a context of the first character to obtain a word segmentation result. The step of obtaining an annotation corresponding to the first character includes: searching a preconfigured word library for a phonetic symbol of the first character based on the word segmentation result.

Preferably, in the above method for file processing, there are at least two predetermined character libraries each containing characters at least partly different from those contained in any of the other predetermined character library/libraries, the method further includes, prior to obtaining the file: receiving matching character library setting information; and setting one of the at least two predetermined character libraries as the matching character library based on the matching character library setting information.

According to another embodiment of the present invention, an apparatus for file processing is provided. The apparatus for file processing includes: a first obtaining unit configured to obtain a file; a parsing unit configured to parse the file to obtain a first character contained in the file; a matching unit configured to match the first character with a preconfigured matching character library; an annotating unit configured to obtain an annotation corresponding to the first character when the first character satisfies a predetermined condition; and a displaying unit configured to display the first character and the annotation.

Preferably, in the above apparatus for file processing, the displaying unit includes: an effect determining unit configured to determine a first display scheme having a first display effect for the first character and a second display scheme having a second display effect for the annotation, the first display effect being different from the second display effect; and a display processing unit configured to display the first character in accordance with the first display scheme and display the annotation in accordance with the second display scheme.

Preferably, the above apparatus for file processing further includes: a second obtaining unit configured to obtain an original composition of the file; a position determining unit configured to determine a display position of the annotation with respect to the first character; a judging unit configured to judge whether there is space to accommodate the annotation at the display position in the original composition; and a composing unit configured to re-compose the file to obtain a new composition when there is no space to accommodate the annotation, such that there is space to accommodate the annotation at the display position in the new composition. The displaying unit is further configured to display the first character in accordance with the new composition obtained by the composing unit and display the annotation at the display position.

Preferably, in the above apparatus for file processing, the annotating unit is further configured to obtain the annotation corresponding to the first character when the first character does not belong to the matching character library or to obtain the annotation corresponding to the first character when the first character belongs to the matching character library.

Preferably, the above apparatus for file processing further includes: a storing unit configured to store the annotation which includes at least one of a phonetic symbol for indicating pronunciation and intonation of the first character, explanation information for explaining meaning of the first character, a play control menu for controlling an audio file playing pronunciation of the first character, and a translation of the first character in a language different from a language in which the first character is written.

Preferably, in the above apparatus for file processing, the storing unit is further configured to store a preconfigured word library. When the annotation includes the phonetic symbol, the apparatus for file processing further includes: a word segmenting unit configured to apply, after the parsing unit obtains the first character, word segmentation to the first character based on a context of the first character to obtain a word segmentation result; and a searching unit configured to search the preconfigured word library stored in the storing unit for a phonetic symbol of the first character based on the word segmentation result.

Preferably, the above apparatus for file processing further includes a storing unit configured to store at least two predetermined character libraries each containing characters at least partly different from those contained in any of the other predetermined character library/libraries, a receiving unit configured to receive matching character library setting information; and a setting unit configured to set one of the at least two predetermined character libraries stored in the storing unit as the matching character library based on the matching character library setting information.

It can be seen from above that, with the method and apparatus for file processing according to the embodiments of the present invention, it is possible to provide an automatic annotation for a particular character in a file, such that the user does not need to interrupt his/her reading process in order to look up the character. In this way, the user's reading continuity can be ensured. Meanwhile, the embodiments of the present invention provide the user with an opportunity to learn more knowledge during reading. All these can improve the user's reading experience.

DETAILED DESCRIPTION OF THE EMBODIMENTS

According to the embodiments of the present invention, characters obtained by parsing a file are matched with a preconfigured matching character library to determine characters to be automatically annotated and their corresponding annotations and those characters are automatically annotated while displaying. In this way, the user's reading experience can be improved. In the following, the present invention will be further explained with reference to the specific embodiments.

First Embodiment

Figure 1:
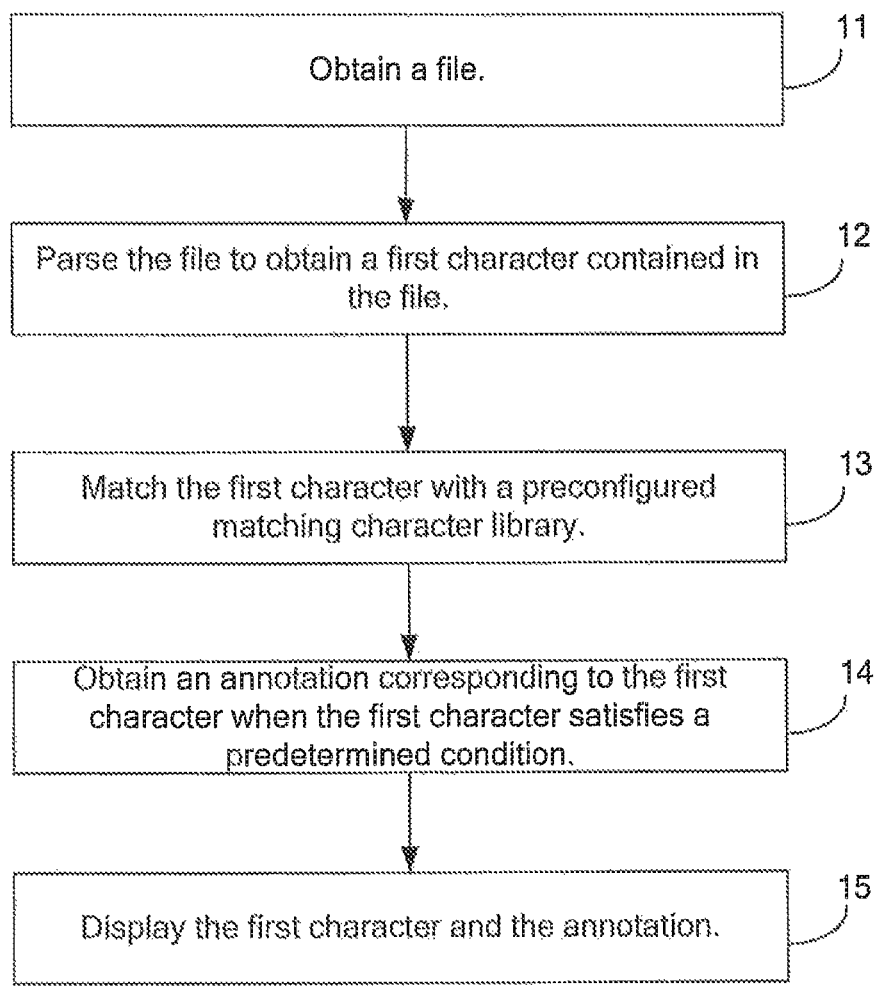
FIG. 1 is a flowchart of a method for file processing according to the first embodiment of the present invention.

As shown in FIG. 1, the method for file processing according to this embodiment can be applied in various electronic devices such as computer, PDA, mobile phone, MP4, e-paper, etc. In particular, the method includes the following steps.

At step 11, a file is obtained.

Here, an electronic device can read a locally stored file, download a file from a network or another device, or read a file online via a network, so as to obtain the file. The file in this embodiment is not limited to any specific file format and can be any file which can be parsed to obtain characters. In particular, the file includes the following three categories:

1) a file containing only text contents, such as a Word document file or a WPS document file;

2) a file containing only non-text contents, such as a PDF file or a picture file; and 3) a file containing both text and non-text contents, such as a video file or a streaming media file containing subtitles.

The "character" in this embodiment may include various languages. In particular, it can be a Chinese character, an English word, a French word, etc.

At step 12, the file is parsed to obtain a first character contained in the file.

Here, the file is parsed in accordance with the format of the file to obtain character(s) contained in the file. In particular, the following explanation is given with respect to the above three categories:

1) For a file containing only text contents, the file is read to obtain the text contents contained in the file (i.e., character(s) contained in the file), e.g., character(s) contained in a Word file.

2) For a file containing only non-text contents, the file is read and character recognized to convert the non-text contents into text contents, so as to obtain character(s) contained in the file, e.g., applying character recognition to an image in a picture to obtain a character represented by the image.

3) For a file containing both text and non-text contents, the file is read by ignoring the non-text contents contained therein and extracting the text contents contained therein, so as to obtain character(s) contained in the file. As an example, for a video file, a video image contained therein is ignored and a character is extracted from its subtitle. As another example, for an e-paper file containing an image, the image is ignored and characters are extracted from its text contents. Of course, if there is also any content to be recognized in the image, it can be further processed in the above manner 2.

The following explanation will be given with respect to the first character obtained by parsing the file.

At step 13, the first character is matched with a preconfigured matching character library. Here, there may be one, two or more matching character libraries.

At step 14, an annotation corresponding to the first character is obtained when the first character satisfies a predetermined condition.

Here, in the step 13, the first character is matched with the preconfigured matching character library to obtain a matching result for the first character. In the step 14, the annotation corresponding to the first character is obtained if the matching result satisfies the predetermined condition. In a preferred embodiment, the predetermined condition can be that the first character does not belong to the matching character library. In this case, the first character not belonging to the matching character library will be annotated. In another preferred embodiment, the predetermined condition can be that the first character belongs to the matching character library. In this case, the first character belonging to the matching character library will be annotated.

In this embodiment, the annotation can be pre-stored in a database which can be maintained in a local storing unit in the electronic device or a storing unit in a network connected with the electronic device. In the above step 14, when the first character satisfies the predetermined condition, the database is searched for the annotation corresponding to the first character using the first character as an index. Here, the annotation includes at least one of the following four categories:

A) a phonetic symbol for indicating pronunciation and intonation of the first character (e.g., it can be a Pinyin with intonation for a Chinese character, or a phonetic symbol with accent mark indicating an accent for an English word);
B) explanation information for explaining meaning of the first character (in particular, an explanation from a standard dictionary for a respective language can be used, e.g., for a Chinese character, its Chinese explanation from "Xinhua Dictionary" or "Ancient Chinese Dictionary" can be used);
C) a play control menu for controlling an audio file playing pronunciation of the first character, by which the audio file can be controlled to be played to audibly demonstrate the particular pronunciation of the first character; and
D) a translation of the first character in a language different from a language in which the first character is written (e.g., if the first character is a Chinese character, it can be its translation in English, French, or other language, or if the first character is an English word, it can be its translation in Chinese).

At step 15, the first character and the annotation are displayed.

Here, in the above steps 13 and 14, the first character is matched with the matching character library to determine whether the matching result for the first character satisfies the predetermined condition or not. If so, a corresponding annotation needs to be added to the first character. In this case, the annotation corresponding to the first character is determined. In the step 15, when the file is displayed, the first character is displayed along with its corresponding annotation.

If the matching result for the first character obtained in the step 13 does not satisfy the predetermined condition, no annotation needs to be added to the first character and the first character can be displayed directly.

With the above steps of this embodiment, when a file is displayed, an automatic annotation is provided for a first character in the file which satisfies a predetermined condition. In this way, the user can be automatically provided with the annotation information associated with the first character without looking up the first character during his/her reading process. Additionally, necessary knowledge can be provided to the user during the reading process, so as to enrich the user's knowledge and facilitate the user's full understanding of the contents of the file. Also the user's reading operation can be simplified and the user's reading experience can be improved.

As a preferred embodiment, during the process in which the file is displayed, the character contained in the contents to be displayed can be processed in real time. In particular, in this case, the above step 12 includes the following steps:
parsing the file to obtain a first content to be displayed in the file (e.g., for a document file, the content to be displayed may be a page in the document file; for a streaming media file, the content can be displayed may be simply a data frame); and
extracting a first character contained in the first content (here the first character can be a character contained in the first content).

If the first character satisfies the predetermined condition, the annotation corresponding to the first character is obtained. In the step 15, the first content containing the first character is displayed along with the annotation corresponding to the first character.

Figure 2:
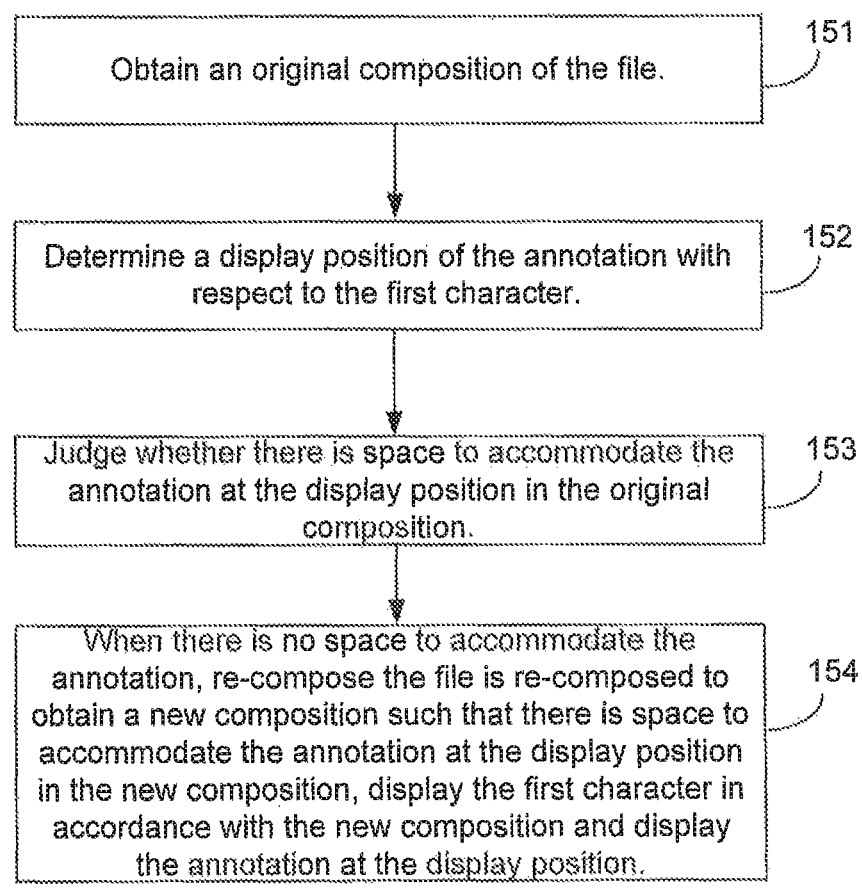
FIG. 2 is a flowchart of steps for displaying a character and an annotation according to the first embodiment of the present invention.

In the following, the detailed steps of the above step 15 will be explained with reference to a preferred embodiment. As shown in FIG. 2, the step 15 includes in particular the following steps.

At step 151, an original composition of the file is obtained.

At step 152, a display position of the annotation with respect to the first character is determined.

Here, in the step 152, the display position of the annotation can be determined according to a reading convention. For example, when the annotation is a Pinyin for a Chinese character, its display position is usually located on the top of its corresponding character. When the annotation is a phonetic symbol for an English word, its display position usually immediately follows the English word in the same line as the English word (if the phonetic symbol cannot be accommodated in the same line, it can be placed in the next line).

At step 153, it is judged whether there is space to accommodate the annotation at the display position in the original composition.

Here, there may be no space to accommodate the annotation since the line spacing of the text is so narrow that the original text would be obscured by the annotation displayed in the space between the lines of the text, or the character spacing is so narrow that the original text would be obscured by the annotation displayed in the space between the characters.

At step 154, when there is no space to accommodate the annotation, the file is re-composed to obtain a new composition such that there is space to accommodate the annotation at the display position in the new composition. The first character is displayed in accordance with the new composition and the annotation is displayed at the display position.

Here, in the step 154, when there is no space to accommodate the annotation, the file can be re-composed as desired to adjust (e.g., increase) the line spacing or add a new line for displaying the annotation, or increase the space between the first character and a character following the first character such that there is space to accommodate the annotation.

As an alternative to the above step 154, instead of re-composing the file, the annotation can be made transparent, that is, the transparency of the annotation can be increased above a defined value, and then the annotation is displayed overlying the first character. In this way, the annotation is displayed visibly without affecting the display of the first character.

At step 155, when there is space to accommodate the annotation, the first character is displayed in accordance with the original composition and the annotation is displayed at the display position.

As a preferred embodiment, different display effects can be used in the above step 15 to display the first character and the annotation. That is, the first character is displayed in accordance with a first display scheme having a first display effect and the annotation is displayed in accordance with a second display scheme having a second display effect different from the first display effect.

Here, according to the user's preference, different display schemes can be pre-configured for the first character and the annotation. Alternatively, a default display scheme can be pre-configured in the electronic device for the first character and the annotation. A display scheme involves parameters such as font, size, color, transparency, static display and dynamic display (flicking effect, fading effect). Prior to displaying in the step 15, the respective display schemes corresponding to the first character and the annotation are determined. Then, they are displayed in accordance with their respective display schemes to achieve different display effects.

As another preferred embodiment, the above display schemes can be combined with the above steps 151 to 155. In the step 154, the first character is displayed with the first display scheme in accordance with the new composition and the annotation is displayed with the second display scheme at the display position. In the step 155, the first character is displayed with the first display scheme in accordance with the original composition and the annotation is displayed with the second display scheme at the display position.

Figure 10:
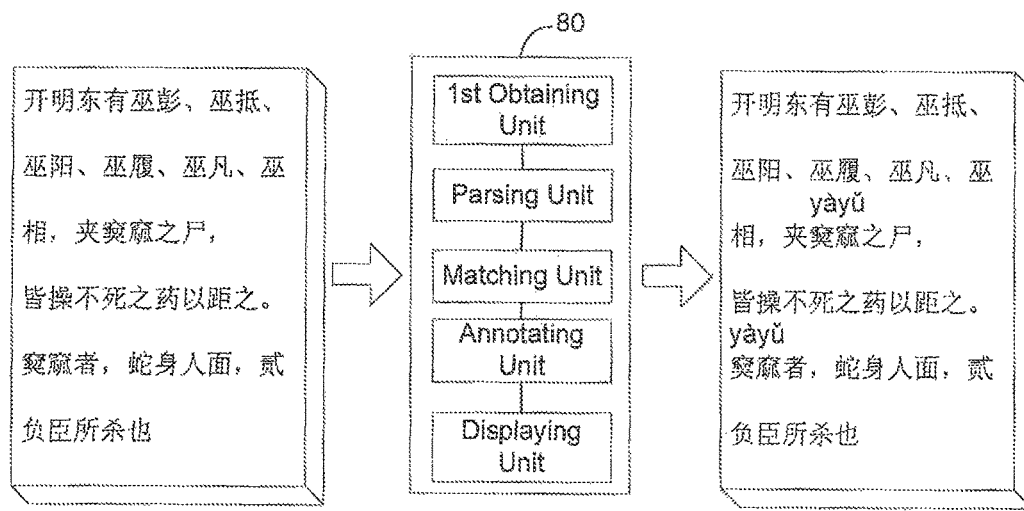
FIG. 10 is a schematic diagram showing a structure of an apparatus for file processing according to an embodiment of the present invention.

Based on the above method for file processing, an apparatus for file processing is also provided in this embodiment. As shown in FIG. 10, in particular, the apparatus 80 for file processing includes: a first obtaining unit configured to obtain a file; a parsing unit configured to parse the file to obtain a first character contained in the file; a matching unit configured to match the first character with a preconfigured matching character library; an annotating unit configured to obtain an annotation corresponding to the first character when the first character satisfies a predetermined condition; and a displaying unit configured to display the first character and the annotation.

As a preferred embodiment, the displaying unit includes: an effect determining unit configured to determine a first display scheme having a first display effect for the first character and a second display scheme having a second display effect for the annotation, the first display effect being different from the second display effect; and a display processing unit configured to display the first character in accordance with the first display scheme and display the annotation in accordance with the second display scheme.

As a preferred embodiment, the apparatus for file processing further includes: a second obtaining unit configured to obtain an original composition of the file; a position determining unit configured to determine a display position of the annotation with respect to the first character; a judging unit configured to judge whether there is space to accommodate the annotation at the display position in the original composition; and a composing unit configured to re-compose the file to obtain a new composition when there is no space to accommodate the annotation, such that there is space to accommodate the annotation at the display position in the new composition. The displaying unit is further configured to display the first character in accordance with the new composition obtained by the composing unit and display the annotation at the display position.

As a preferred embodiment, the annotating unit is further configured to obtain the annotation corresponding to the first character when the first character does not belong to the matching character library or to obtain the annotation corresponding to the first character when the first character belongs to the matching character library.

As a preferred embodiment, the apparatus for file processing further includes: a storing unit configured to store the annotation which comprises at least one of a phonetic symbol for indicating pronunciation and intonation of the first character, explanation information for explaining meaning of the first character, a play control menu for controlling an audio file playing pronunciation of the first character, and a translation of the first character in a language different from a language in which the first character is written.

FIG. 10 further shows a display effect after processing Chinese characters in a file using the apparatus for file process according to this embodiment. In FIG. 10, the left graph shows a file in its original composition and the right graph shows the display effect after the process according to this embodiment, in which a Pinyin annotation "yáyŭ" is added for the rare characters "窫窳".

Second Embodiment

As a preferred embodiment, in this embodiment, all contents in a file can be pre-processed to obtain all characters contained in the file and, in turn, determine whether to display characters of a first type which need annotations and their corresponding annotations. Then, the characters of the first type contained in the contents to be displayed are determined, such that their corresponding annotations are displayed when the file is displayed.

Figure 3:
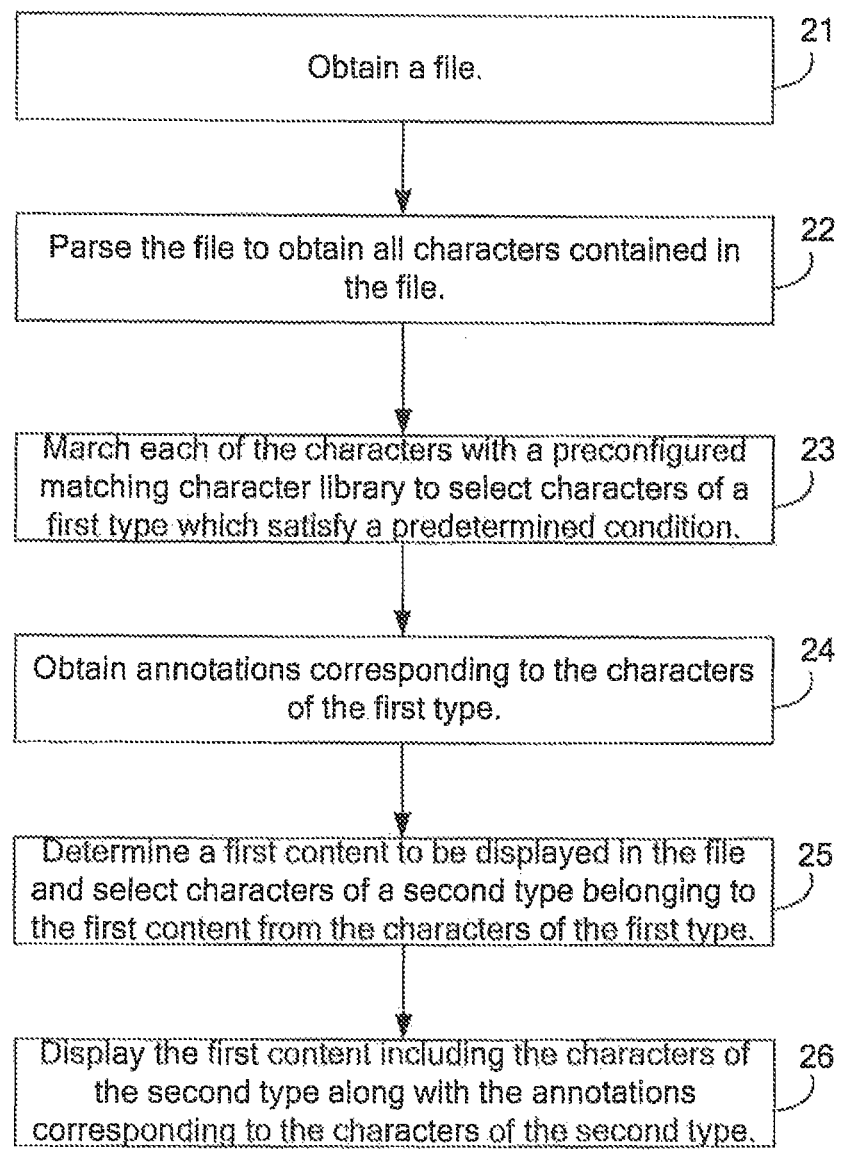
FIG. 3 is a flowchart of a method for file processing according to the second embodiment of the present invention.

As shown in FIG. 3, the method for file processing according to this embodiment can be applied in various electronic devices and includes the following steps.

At step 21, a file is obtained.

At step 22, the file is parsed to obtain all contents of the file from which all characters are extracted.

At step 23, each of the characters is matched with a preconfigured matching character library to select characters of a first type which satisfy a predetermined condition.

Here, the predetermined condition and the configuration of the matching character library can be the same as those in the first embodiment.

At step 24, annotations corresponding to the characters of the first type are obtained.

At step 25, a first content to be displayed in the file is determined and characters of a second type belonging to the first content are selected from the characters of the first type.

At step 26, the first content including the characters of the second type is displayed along with the annotations corresponding to the characters of the second type.

This embodiment has been explained with reference to an example in which all characters contained in a file are considered. When the file is parsed, the characters of the first type which satisfy the predetermined condition are selected from all the characters in the file by matching them with the matching character library. Then, the annotations corresponding to the characters of the first type are obtained. When a particular content is displayed, the annotations corresponding to the characters of the first type contained in the content are displayed at the same time. In this way, automatic annotation can be provided for certain characters in the file.

Next, the present invention will be further explained with reference to more embodiments based on the first embodiment.

Third Embodiment

This embodiment will be explained with reference to an example in which the annotation includes a phonetic symbol.

When the annotation includes the phonetic symbol, the matching character library according to this embodiment includes a preconfigured common character library. In this case, the predetermined condition is that the first character does not belong to the common character library. The common character library includes preconfigured common characters. For example, for Chinese characters, characters in the Level-1 character library specified in the Chinese National Standard GB2312 can be considered as common characters. For English words, the College English Test (CET) Band 6 (CET-6) English words can be considered as common words (characters).

Figure 4:
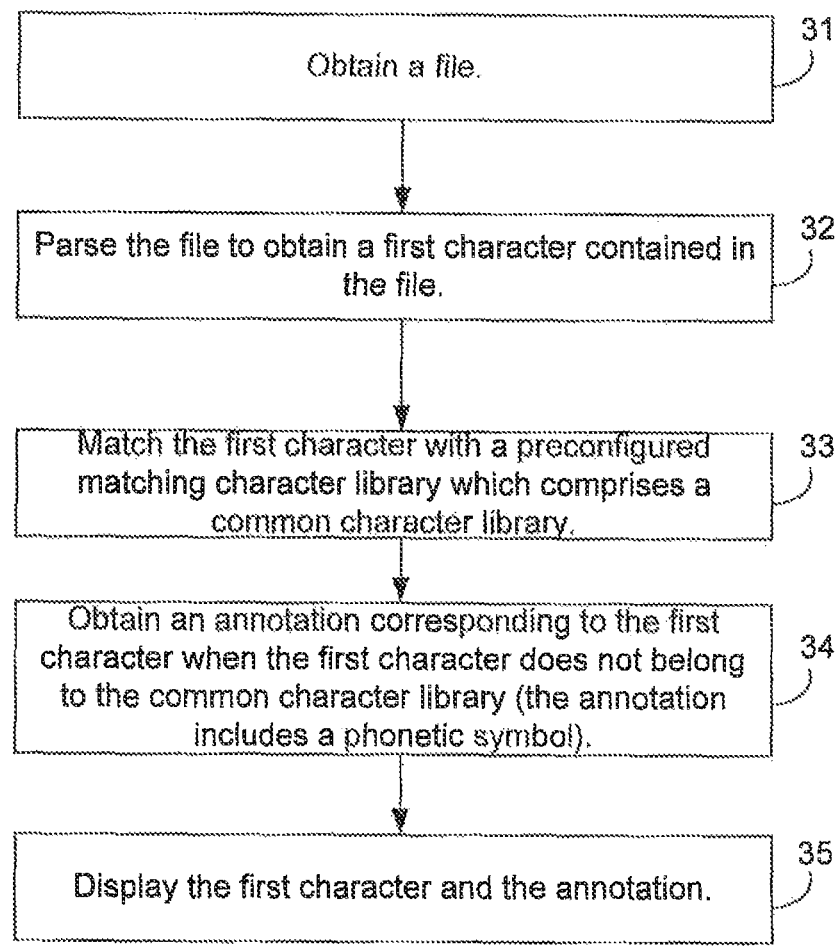
FIG. 4 is a flowchart of a method for file processing according to the third embodiment of the present invention.

As shown in FIG. 4, the method for file processing according to this embodiment can be applied in various electronic devices such as computer, PDA, mobile phone, MP4, e-paper, etc. In particular, the method includes the following steps.

At step 31, a file is obtained.

At step 32, the file is parsed to obtain a first character contained in the file.

At step 33, the first character is matched with a preconfigured matching character library. Here, the matching character library includes a preconfigured common character library.

At step 34, an annotation corresponding to the first character is obtained when the first character does not belong to the common character library. Here, the annotation includes a phonetic symbol and possibly explanation information and the like.

At step 35, the first character and the annotation are displayed.

With the above steps, this embodiment provides a function of automatic annotation for uncommon characters, such that the user can learn the uncommon characters during his/her reading process. In this way, the efficiency of such reading/learning can be enhanced and the user's reading experience can be improved.

Fourth Embodiment

This embodiment will be explained with reference to an example in which the annotation includes a phonetic symbol.

Conventionally, when a user encounters an uncommon character during the reading process, he/she may initiatively look up a dictionary to obtain information on its pronunciation and explanation. However, for some error-prone characters, if the user considers a wrong pronunciation as a correct pronunciation by mistake, he/she generally will not initiatively confirm the pronunciation of such error-prone character during the reading process. That is, the user cannot correct his/her error and cannot learn the correct pronunciation. In this embodiment, an error-prone character library is provided and the pronunciations of the characters in the error-prone character library can be automatically indicated during the reading process. In this way, it is possible to provide the user with an opportunity to learn the correct pronunciation and to improve the user's reading experience.

When the annotation includes the phonetic symbol, the matching character library according to this embodiment includes a preconfigured error-prone character library. In this case, the predetermined condition is that the first character belongs to the error-prone character library. The error-prone character library includes preconfigured characters prone to pronunciation errors. For example, some Chinese characters have more than one pronunciation, e.g., the character "行" have different pronunciations for "银行" and "行人". As another example, an English geographic name "San Jose" is an English phrase originating from Spain and is usually pronounced incorrectly. In order to determine the pronunciations of such characters/words prone to pronunciation error, word segmentation can be applied based on their contexts. Then, a word library containing pronunciation information can be searched based on the word segmentation result to determine their correct pronunciations.

Figure 5:
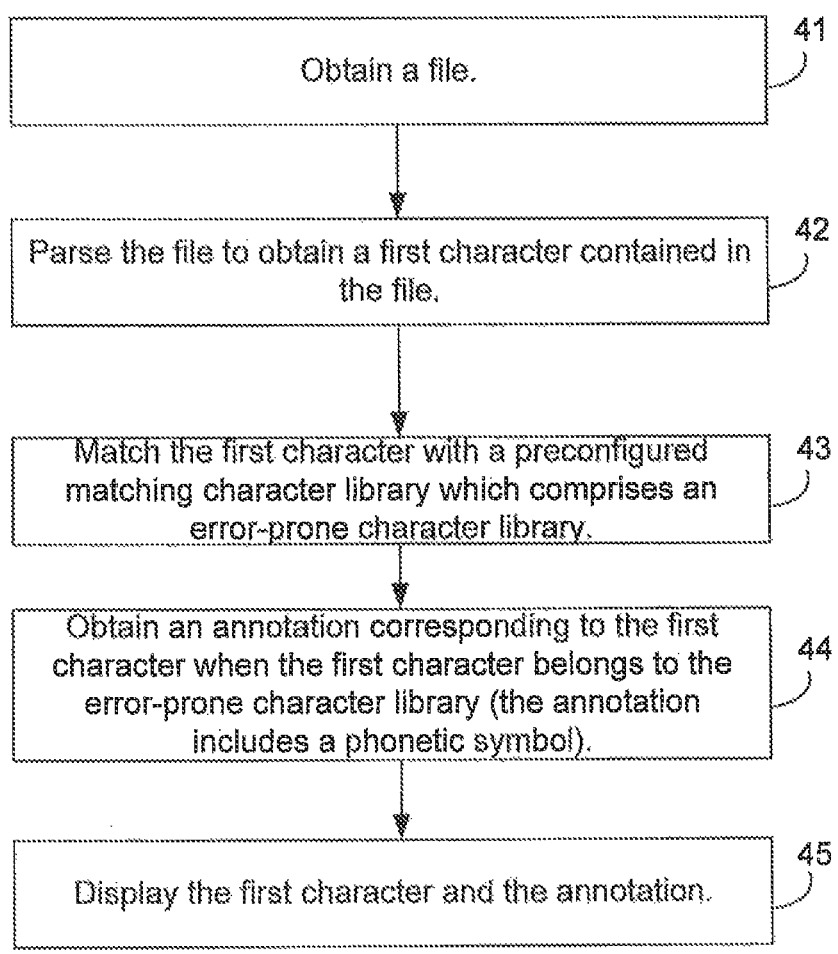
FIG. 5 is a flowchart of a method for file processing according to the fourth embodiment of the present invention.

As shown in FIG. 5, the method for file processing according to this embodiment can be applied in various electronic devices such as computer, PDA, mobile phone, MP4, e-paper, etc. In particular, the method includes the following steps.

At step 41, a file is obtained.

At step 42, the file is parsed to obtain a first character contained in the file.

At step 43, the first character is matched with a preconfigured matching character library. Here, the matching character library includes a preconfigured error-prone character library.

At step 44, an annotation corresponding to the first character is obtained when the first character belongs to the common character library. Here, the annotation includes a phonetic symbol and possibly explanation information and the like.

At step 45, the first character and the annotation are displayed.

Here, as a preferred embodiment, when the first character is a Chinese character, the above step 42 further includes, after parsing the file to obtain the first character contained in the file, applying word segmentation to the first character based on a context of the first character to obtain a word segmentation result. The above step 44 further includes: searching a preconfigured word library for a phonetic symbol of the first character based on the word segmentation result.

With the above steps, this embodiment provides a function of automatic annotation for characters prone to pronunciation error, such that the user can learn the correct pronunciations of the error-prone characters during his/her reading process. In this way, the efficiency of such reading/learning can be enhanced and the user's reading experience can be improved.

Accordingly, an apparatus for file processing is also provided according to this embodiment. The apparatus includes:

a first obtaining unit configured to obtain a file;

a parsing unit configured to parse the file to obtain a first character contained in the file;

a matching unit configured to match the first character with a preconfigured matching character library;

an annotating unit configured to obtain an annotation corresponding to the first character when the first character satisfies a predetermined condition;

a displaying unit configured to display the first character and the annotation; and a storing unit configured to store the annotation which includes at least one of a phonetic symbol for indicating pronunciation and intonation of the first character, explanation information for explaining meaning of the first character, a play control menu for controlling an audio file playing pronunciation of the first character, and a translation of the first character in a language different from a language in which the first character is written.

As a preferred embodiment, the storing unit is further configured to store a preconfigured word library. When the annotation includes the phonetic symbol, the apparatus for file processing further includes:

a word segmenting unit configured to apply, after the parsing unit obtains the first character, word segmentation to the first character based on a context of the first character to obtain a word segmentation result; and a searching unit configured to search the preconfigured word library stored in the storing unit for a phonetic symbol of the first character based on the word segmentation result.

Fifth Embodiment

Figure 6:
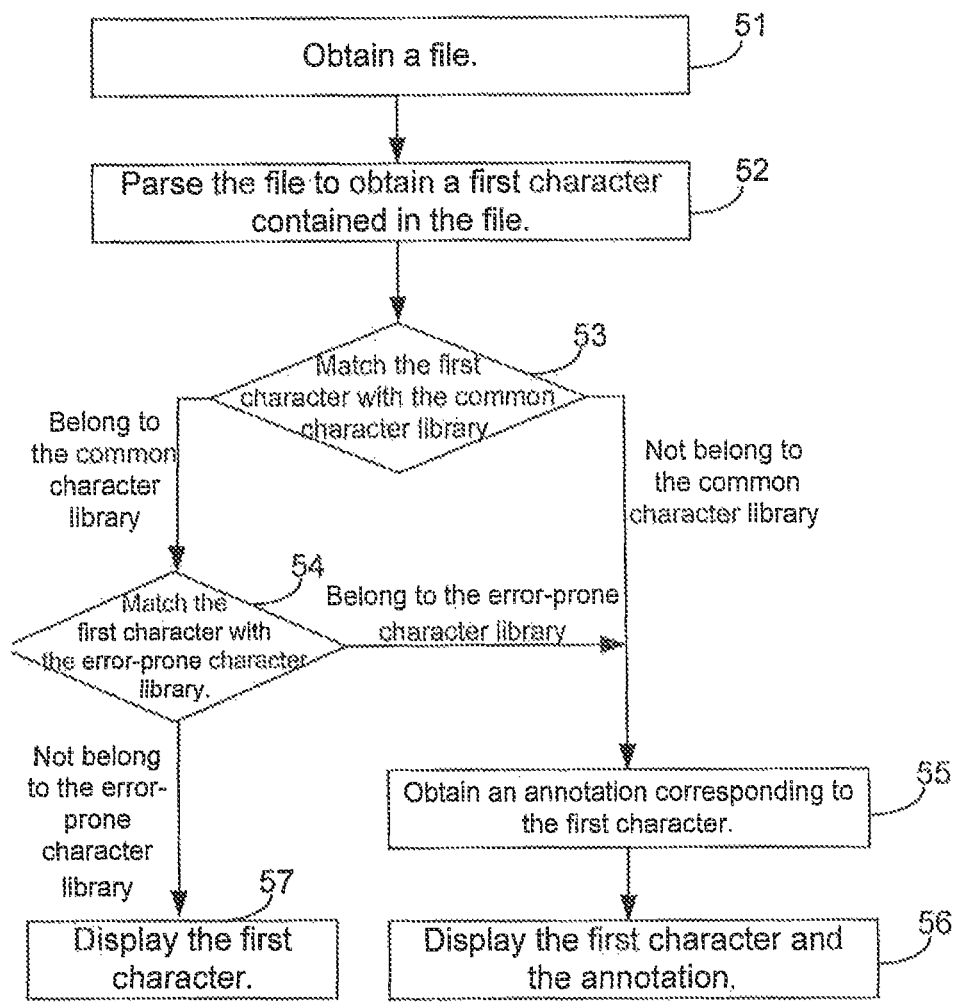
FIG. 6 is a flowchart of a method for file processing according to the fifth embodiment of the present invention.

In the method for file processing according to this embodiment, the matching character library includes a preconfigured common character library and a preconfigured error-prone character library. In this case, the predetermined condition is that the first character does not belong to the common character library or that the first character belongs to the error-prone character library. In this case, as shown in FIG. 6, the method for file processing according to this embodiment includes in particular the following steps.

At step 51, a file is obtained.

At step 52, the file is parsed to obtain a first character contained in the file.

At step 53, the first character is matched with a preconfigured common character library. When the first character belongs to the common character library, the method proceeds to step 54. When the first character does not belong to the common character library, the method proceeds to step 55.

At step 54, the first character is matched with a preconfigured error-prone character library. When the first character belongs to the error-prone character library, the method proceeds to step 55. When the first character does not belong to the error-prone character library, the method proceeds to step 57.

At step 55, an annotation corresponding to the first character is obtained. Then the method proceeds to step 56.

At step 56, the first character and the annotation are displayed. The annotation includes a phonetic symbol.

At step 57, the first character is displayed.

According to the above steps, the first character is first matched with the common character library. If the first character belongs to the common character library, it is further judged whether the first character matches the error-prone character library to finally determine whether the first character is an error-prone character. If the first character is determined to be an error-prone character, the annotation for the first character needs to be determined and displayed along with the first character.

Of course, the above matching sequence can be changed in this embodiment. That is, the first character can be first matched with the error-prone character library. If the first character does not belong to the error-prone character library, it is further judged whether the first character matches the common character library to finally determine whether the first character is an error-prone or uncommon character.

With the above steps, this embodiment allows for adding the annotation corresponding to the first character when displaying the first character if the first character is an error-prone character or an uncommon character, such that the user's reading experience can be improved.

Six Embodiment

When reading a file, different users may have different knowledge. For example, a primary school student generally knows less Chinese characters and English words than a college student. Thus, a number of character libraries can be preconfigured. For example, for English words, word libraries at various levels including English words for different levels can be provided, such as a CET Band 4 (CET-4) word library and a CET-6 word library. For Chinese characters, character libraries corresponding to different grades can be provided for students in different grades. For example, a Grade-1 character library containing Chinese characters known to students in Grade 1 can be provided for students in Grade 1, a Grade-2 character library containing Chinese characters known to students in Grade 2 can be provided for students in Grade 2, and so on.

Figure 7:
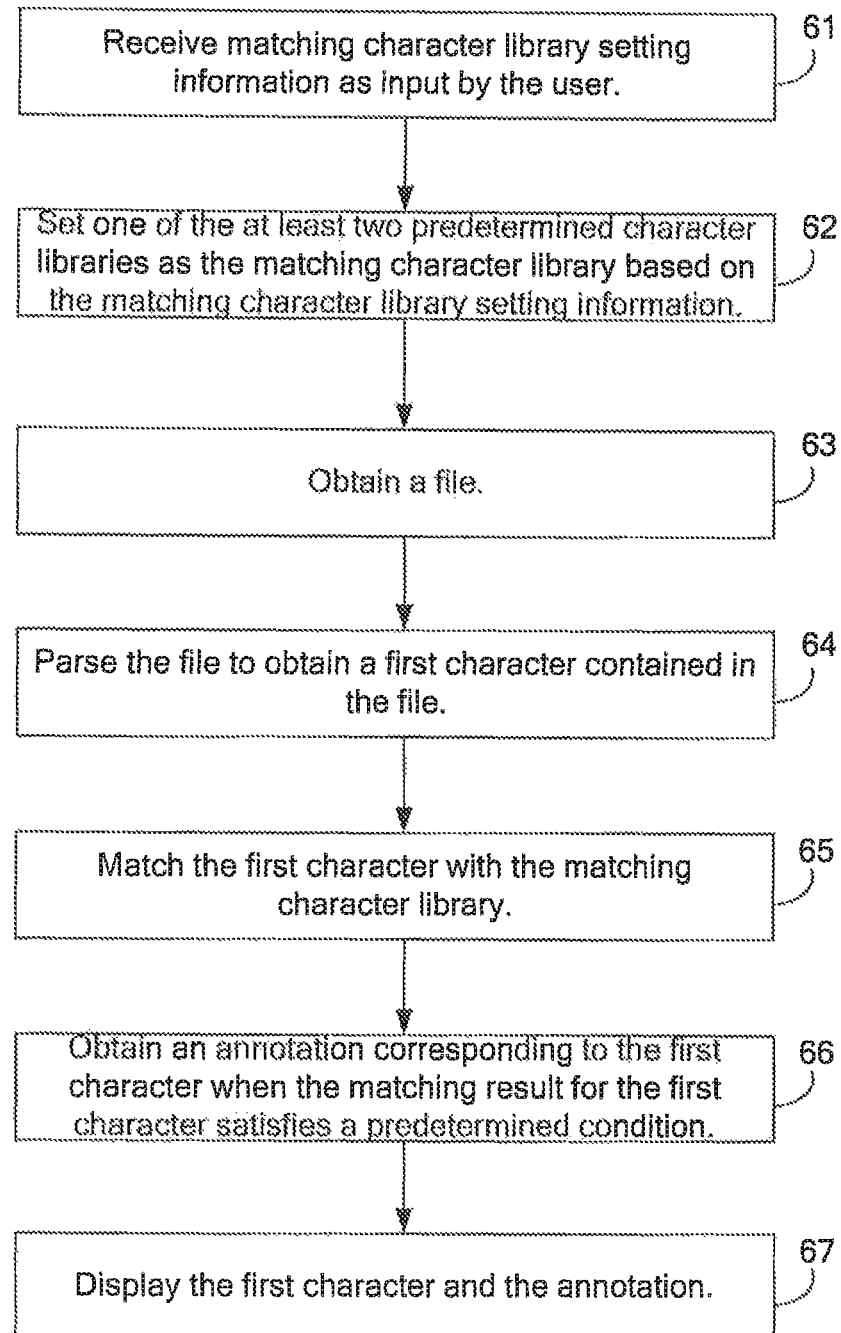
FIG. 7 is a flowchart of a method for file processing according to the six embodiment of the present invention.

As such, at least two predetermined character libraries are preconfigured in this embodiment, each containing characters at least partly different from those contained in any of the other predetermined character library/libraries, The method for file processing according to this embodiment can be applied in various electronic devices such as computer, PDA, mobile phone, MP4, e-paper, etc. In particular, as shown in FIG. 7, the method includes the following steps.

At step 61, matching character library setting information as input by the user is received.

At step 62, one of the at least two predetermined character libraries is set as the matching character library based on the matching character library setting information.

At step 63, a file is obtained.

At step 64, the file is parsed to obtain a first character contained in the file.

At step 65, the first character is matched with the matching character library.

At step 66, when the matching result for the first character satisfies a predetermined condition, an annotation corresponding to the first character is obtained.

At step 67, the first character and the annotation are displayed.

Here, if the matching result for the first character does not satisfy the predetermined condition in the step 65, the annotation of the first character will not be displayed when displaying the first character.

With the above steps, this embodiment provides a function of automatic annotation for uncommon characters, such that the user can learn the uncommon characters during his/her reading process. In this way, the efficiency of such reading/learning can be enhanced and the user's reading experience can be improved.

When the user reads the file, he/she can learn the first character for which the annotation is displayed. When the user reads the file for a number of times, he/she may have already known the annotation of the first character. In this case, it is much less necessary to display the annotation of the first character again. Thus, in this embodiment, after the matching character library is set, the number of times the file has been displayed can be further counted. Prior to the step 67 in which the first character and the annotation are displayed, it is determined whether the number of times the file has been displayed reaches a preconfigured value corresponding to the matching character library. If the value corresponding to the matching character library is reached, the annotation will not be displayed when displaying the first character. If the value corresponding to the matching character library is not reached, the annotation will be displayed along with the first character.

Accordingly, an apparatus for file processing is also provided according to this embodiment. The apparatus includes:

a first obtaining unit configured to obtain a file;

a parsing unit configured to parse the file to obtain a first character contained in the file;

a matching unit configured to match the first character with a preconfigured matching character library;

an annotating unit configured to obtain an annotation corresponding to the first character when the first character satisfies a predetermined condition;

a displaying unit configured to display the first character and the annotation;

a storing unit configured to store at least two predetermined character libraries each containing characters at least partly different from those contained in any of the other predetermined character library/libraries, a receiving unit configured to receive matching character library setting information; and a setting unit configured to set one of the at least two predetermined character libraries stored in the storing unit as the matching character library based on the matching character library setting information.

Seventh Embodiment

A user's knowledge level varies when reading a file. As the number of times the user reads the file increases, he/she will learn more characters and his/her knowledge level is improved. Thus, in this embodiment, the current matching character library can be set based on the counted number of times the user has read the file, such that the matching character library can be adapted to the current knowledge level of the user. The details will be given below.

Figure 8:
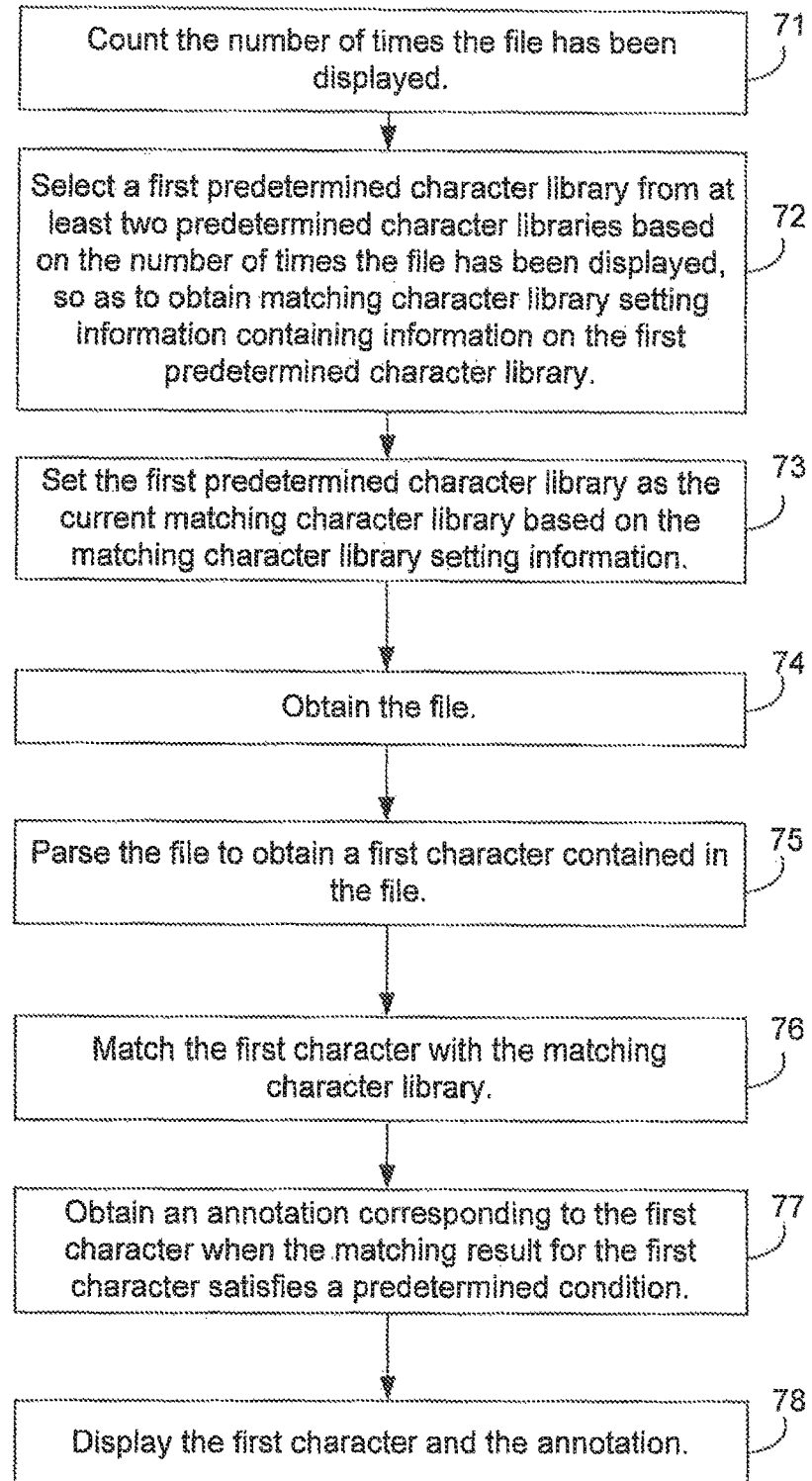
FIG. 8 is a flowchart of a method for file processing according to the seven embodiment of the present invention.

In this embodiment, at least two predetermined character libraries are preconfigured, each containing characters at least partly different from those contained in any of the other predetermined character library/libraries. Further, in this embodiment, a threshold value with respect to number of times associated with each of the predetermined character libraries is set in advance. Here, the threshold value varies from one predetermined character library to another. The method for file processing according to this embodiment can be applied in various electronic devices such as computer, PDA, mobile phone, MP4, e-paper, etc. In particular, as shown in FIG. 8, the method includes the following steps.

At step 71, the number of times the file has been displayed is counted.

At step 72, a first predetermined character library is selected from at least two predetermined character libraries based on the number of times the file has been displayed, so as to obtain matching character library setting information containing information on the first predetermined character library. Here, the first predetermined character library is the predetermined character library associated with the smallest threshold value among those predetermined character libraries each associated with a threshold value larger than the number of times the file has been displayed.

At step 73, the first predetermined character library is set as the current matching character library based on the matching character library setting information.

At step 74, the file is obtained.

At step 75, the file is parsed to obtain a first character contained in the file.

At step 76, the first character is matched with the matching character library.

At step 77, when the matching result for the first character satisfies a predetermined condition, an annotation corresponding to the first character is obtained.

At step 78, the first character and the annotation are displayed.

The above step 73 according to this embodiment is different from the step 62 in the sixth embodiment. Instead of receiving the matching character library setting information input by the user and setting the matching character library based on the information in the steps 61 and 62 in the sixth embodiment, in the above step 73, the electronic device automatically generates the matching character library setting information based on a predetermined policy and setting a corresponding predetermined character library as the matching character library based on the matching character library setting information.

With the above steps according to this embodiment, it is possible to provide a function of automatically setting the current match character library based on the number of time the file has been read (displayed), such that the matching character library can be adapted to the current knowledge level of the user.

As an example, it is assumed that the predetermined character libraries are common character libraries and that there are common character libraries at three different levels. The number of common characters contained in the Level-1 common character library is smaller than the number of common characters contained in the Level-2 common character library, which is in turn smaller than the number of common characters contained in the Level-3 common character library. Further, the threshold value with respect to number of times associated with the Level-1 common character library is set to be smaller than the threshold value with respect to number of times associated with the Level-2 common character library, which is in turn set to be smaller than the threshold value with respect to number of times associated with the Level-3 common character library. A possible example is listed in the table below.

|  | Level-1 Common Character Library | Level-2 Common Character Library | Level-3 Common Character Library |
| --- | --- | --- | --- |
| No. of Common Characters | 3600 | 6000 | 9200 |
| Threshold Value | 3 | 10 | 30 |

Here, the threshold value means that, if the number of times the file has been displayed reaches the threshold value associated with the current matching character library, another predetermined character library associated with a larger threshold value is to be set as the matching character library. For example, when the current matching character library is the Level-1 common character library and the file has been displayed for three times, the Level-2 common character library, which is associated with a threshold value larger than three, is to be set as the matching character library. That is, if the file has been displayed for three times, from the Level-2 and Level-3 common character libraries each associated with a threshold value larger than three, the Level-2 common character having a relatively smaller threshold value, 10, is selected as the matching character library. If the file has been displayed for more than 30 times, no matching character library will be set since there is no common character library associated with a threshold value larger than 30. In this case, the file has been displayed for many times and the user has sufficiently learned the uncommon characters in the file. Thus, there is no need to display the annotation again.

Eighth Embodiment

Some characters may have different pronunciation in different countries. For example, some English words have an American pronunciation in US and a British pronunciation in UK. Some characters may have different dialects in different regions. That is, the pronunciations of these characters are dependent on geographical locations. In this regard, in this embodiment, a predetermined character library is preconfigured. Each of the characters contained in the predetermined character library has at least two pronunciations including a first pronunciation corresponding to a first geographical location and a second pronunciation corresponding to a second geographical location different from the first geographical location. Additionally, a phonetic symbol database is provided to store phonetic symbols indicating different pronunciations of each character in the predetermined character library in different geographical locations.

Figure 9:
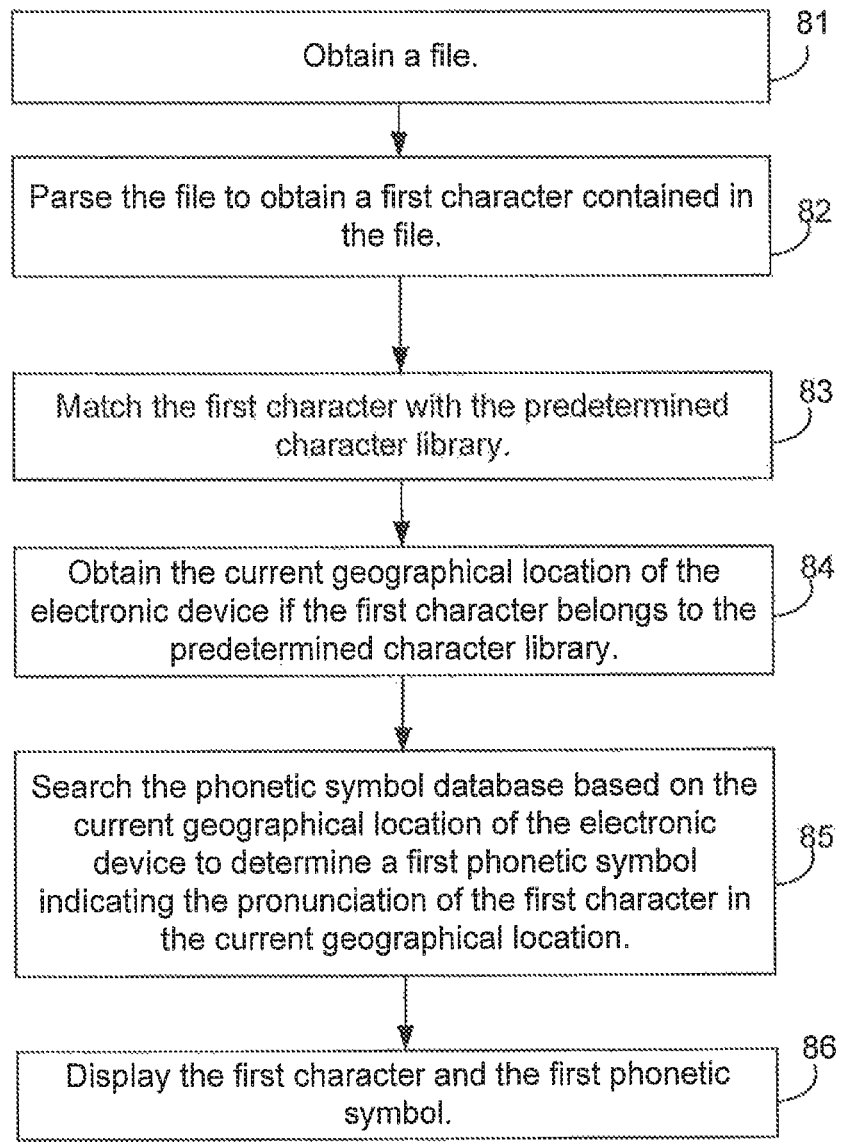
FIG. 9 is a flowchart of a method for file processing according to the eighth embodiment of the present invention.

The method for file processing according to this embodiment can be applied in an electronic device. In particular, as shown in FIG. 9, the method includes the following steps.

At step 81, a file is obtained.

At step 82, the file is parsed to obtain a first character contained in the file.

At step 83, the first character is matched with the predetermined character library.

At step 84, if the first character belongs to the predetermined character library, the current geographical location of the electronic device is obtained.

Here, the current geographical location of the electronic device can be obtained based on IP address of the electronic device by searching a database maintaining correspondences between geographical locations and the IP addresses, or the current geographical location of the electronic device can be obtained by positioning the electronic device using a Global Positioning System (GPS).

At step 85, the phonetic symbol database is searched based on the current geographical location of the electronic device to determine a first phonetic symbol indicating the pronunciation of the first character in the current geographical location.

At step 86, the first character and the first phonetic symbol are displayed.

In this way, this embodiment allows for presenting pronunciations of characters in the current geographical location to the user based on the user's current geographical location, such that the user may follow the local rules to communicate with local people.

In summary, with the method and apparatus for file processing according to the embodiments of the present invention, it is possible to provide an automatic annotation for a particular character in a file, such that the user does not need to interrupt his/her reading process in order to look up the character. In this way, the user's reading continuity can be ensured. Meanwhile, the embodiments of the present invention provide the user with an opportunity to learn more knowledge during reading. All these can improve the user's reading experience.

The embodiments of the present invention have been described above. It should be noted that modifications and improvements can be made by those skilled in the art without departing from the principle of the present invention, which are all encompassed by the scope of the present invention.

What is claimed is:

1. A method for automatic file processing, comprising:
   obtaining a file;
   parsing the file to obtain a first character contained in the file;
   matching the first character with a first preconfigured matching character library, so as to determine whether to automatically annotate the first character or not, wherein, there are at least two predetermined character libraries each containing characters at least partly different from those contained in any other predetermined character library, and the first preconfigured matching character library is a selected predetermined character library associated with a smallest threshold value among those predetermined character libraries each associated with a threshold value larger than a number of times the file has been displayed;
   obtaining an annotation corresponding to the first character if it is determined to automatically annotate the first character;
   determining whether the number of times the file has been displayed reaches a preconfigured value corresponding to the first preconfigured matching character library;
   displaying the first character and the annotation if the value corresponding to the first preconfigured matching character library is not reached; and
   displaying the first character without displaying the annotation if the value corresponding to the first preconfigured matching character library is reached.

2. The method for file processing of claim 1, wherein displaying the first character and the annotation comprises:
   displaying the first character in accordance with a display scheme having a first display effect; and
   displaying the annotation in accordance with a second display scheme having a second display effect different from the first display effect.

3. The method for file processing of claim 1, wherein displaying the first character and the annotation comprises:
obtaining an original composition of the file;
determining a display position of the annotation with respect to the first character;
judging whether there is space to accommodate the annotation at the display position in the original composition; and
re-composing the file to obtain a new composition when there is no space to accommodate the annotation, such that there is space to accommodate the annotation at the display position in the new composition, displaying the first character in accordance with the new composition and displaying the annotation at the display position.

4. The method for file processing of claim 1, wherein it is determined to automatically annotate the first character if the first character does not belong to the matching character library, or it is determined to automatically annotate the first character if the first character belongs to the matching character library.

5. The method for file processing of claim 1, wherein the annotation comprises at least one of a phonetic symbol for indicating pronunciation and intonation of the first character, explanation information for explaining meaning of the first character, a play control menu for controlling an audio file playing pronunciation of the first character, and a translation of the first character in a language different from a language in which the first character is written.

6. The method for file processing of claim 5, wherein when the annotation comprises the phonetic symbol, the matching character library comprises a preconfigured common character library including preconfigured common characters and a preconfigured error-prone character library including preconfigured characters prone to pronunciation errors, and
it is determined to automatically annotate the first character if the first character does not belong to the common character library or if the first character belongs to the error-prone character library.

7. The method for file processing of claim 5, wherein when the annotation comprises the phonetic symbol, the method further comprises, after parsing the file to obtain the first character contained in the file: applying word segmentation to the first character based on a context of the first character to obtain a word segmentation result, and
wherein obtaining an annotation corresponding to the first character comprises:
searching a preconfigured word library for a phonetic symbol of the first character based on the word segmentation result.

8. An apparatus for automatic file processing, comprising:
a display;
at least one processor, and
a memory comprising instructions which, when executed by the at least one processor, cause the apparatus to:
obtain a file;
parse the file to obtain a first character contained in the file;
match the first character with a first preconfigured matching character library, so as to determine whether to automatically annotate the first character or not, wherein there are at least two predetermined character libraries each containing characters at least partly different from those contained in any other predetermined character library, and the first preconfigured matching character library is a selected predetermined character library associated with the smallest threshold value among those predetermined character libraries each associated with a threshold value larger than a number of times the file has been displayed;
obtain an annotation corresponding to the first character when the first character satisfies a predetermined condition if it is determined to automatically annotate the first character; and
cause the display to display the first character and the annotation if the number of times the file has been displayed does not reach a preconfigured value corresponding to the first preconfigured matching character library, and to display the first character without displaying the annotation if the number of times the file has been displayed reaches the preconfigured value corresponding to the first preconfigured matching character library.

9. The apparatus for file processing of claim 8, wherein the instructions, when executed by the at least one processor, further cause the apparatus to:
determine a first display scheme having a first display effect for the first character and a second display scheme having a second display effect for the annotation, the first display effect being different from the second display effect; and
cause the display to display the first character in accordance with the first display scheme and display the annotation in accordance with the second display scheme.

10. The apparatus for file processing of claim 8, wherein the instructions, when executed by the at least one processor, further cause the apparatus to:
obtain an original composition of the file;
determine a display position of the annotation with respect to the first character;
judge whether there is space to accommodate the annotation at the display position in the original composition; and
re-compose the file to obtain a new composition when there is no space to accommodate the annotation, such that there is space to accommodate the annotation at the display position in the new composition; and
cause the display to display the first character in accordance with the new composition obtained by the composing unit and display the annotation at the display position.

11. The apparatus for file processing of claim 8, wherein the instructions, when executed by the at least one processor, further cause the apparatus to obtain the annotation corresponding to the first character when the first character does not belong to the matching character library or to obtain the annotation corresponding to the first character when the first character belongs to the matching character library.

12. The apparatus for file processing of claim 8, wherein the instructions, when executed by the at least one processor, further cause the apparatus to:
store the annotation which comprises at least one of a phonetic symbol for indicating pronunciation and intonation of the first character, explanation information for explaining meaning of the first character, a play control menu for controlling an audio file playing pronunciation of the first character, and a translation of the first character in a language different from a language in which the first character is written.

13. The apparatus for file processing of claim 12, wherein the instructions, when executed by the at least one processor, further cause the apparatus to
  store a preconfigured word library,
  when the annotation comprises the phonetic symbol, the instructions which, when executed by the at least one processor, further cause the apparatus to:
  apply, after the parsing unit obtains the first character, word segmentation to the first character based on a context of the first character to obtain a word segmentation result; and
  search the preconfigured word library stored in the storing unit for a phonetic symbol of the first character based on the word segmentation result.

* * * * *